Patented July 10, 1951

2,559,617

UNITED STATES PATENT OFFICE 2,559,617

MANUFACTURE OF MELAMINE

Raymond H. Hartigan, Pittsburgh, Pa., assignor to Koppers Company, Inc., Pittsburgh, Pa., a corporation of Delaware No Drawing. Application November 5, 1947, Serial No. 784,303

2 Claims. (Cl. 260—249.7)

This invention relates to the manufacture of melamine. More particularly the invention relates to the amination of cyanuric halides with ammonia.

Hofmann (Ber. 18, 2755 to 81 (1885)) described the manufacture of a monohalodiamino triazine by the treatment of cyanuric chloride with aqueous ammonia at room temperature. Hofmann also disclosed the treatment of cyanuric chloride with aqueous ammonia under pressure with temperatures at or above 100° C. by which cyanuric chloride might be aminated to produce melamine.

Melamine made from cyanuric halide and aqueous ammonia contains small amounts of hydroxylated compounds as by-products, e. g., ammeline and ammelide. Ammeline and ammelide interfere with the resinification of melamine and make the resins so formed less water-resistant. Further aqueous ammonium chloride formed by the known amination reaction is very corrosive to equipment, so that special equipment is required for handling this product.

The primary object of the present invention is to provide a process of producing melamine from cyanuric bromide or other cyanuric halides.

All three halide atoms in the cyanuric ring may be replaced by amino groups if the cyanuric halide is treated with anhydrous ammonia at a temperature of 100° C. or greater and a pressure above 500 lbs. per sq. inch. I have found that two of the halogens in the cyanuric ring may be replaced by amino groups by treatment of cyanuric halide with anhydrous ammonia at atmospheric pressure to produce a monohalodiamino triazine in accordance with the following equations:

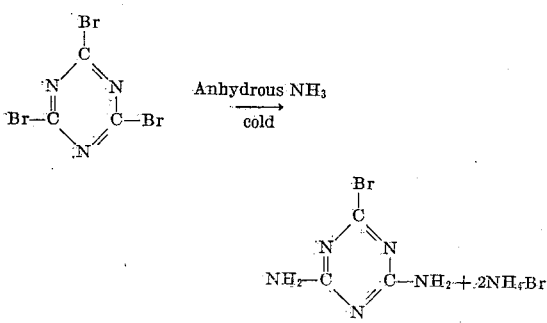

This monohalo diaminotriazine may then be treated with anhydrous ammonia under a pressure of greater than 500 lbs. per sq. inch, and a temperature of 100° C. or greater to replace the remaining halogen atom and obtain a complete recovery of melamine.

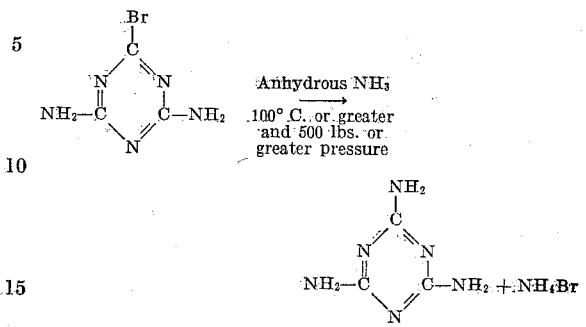

A further object of the invention is to provide a process by which cyanuric halide may be aminated in stages to produce melamine.

Cyanuric halide may be produced by the halogenation of hydrocyanic acid or sodium cyanide to cyanogen halide, which is then catalytically converted to the cyanuric compound at a comparatively low temperature. If the catalyst is aluminum bromide and the halide is cyanogen bromide, then a cyanuric bromide is formed. The process of making cyanuric bromide and cyanuric mixed halide (bromide and chloride) is described in a co-pending application of Raymond H. Hartigan, Serial No. 638,399, filed December 29, 1945, now Patent 2,514,053, Feb. 13, 1951.

I have found that the halogen atoms in the cyanuric halide or the cyanuric mixed halide may be aminated efficiently with anhydrous ammonia. If either of these cyanuric halides is treated at atmospheric pressure and temperature with anhydrous ammonia a monohalo diaminotriazine is formed. This monohalo diaminotriazine may then be treated with anhydrous ammonia at a pressure above 500 lbs., and a temperature above 100° C. to produce melamine. In the reactions an ammonium halide compound such as ammonium bromide or ammonium chloride is formed but this halide compound remains dissolved in the liquid anhydrous ammonia and may be separated from the melamine or from the triazine compound by filtration and washing with liquid ammonia.

Cyanuric bromide or chloride or cyanuric mixed halide (chloride and bromide) may be aminated directly to melamine if the product is treated with an excess of anhydrous ammonia and heated to a temperature above 100° C. at a pressure of greater than 500 lbs. This reaction provides a substantially complete replacement of the halogen atoms with the amino groups.

I have found that if the cyanuric halide is aminated directly to melamine, or if a monohalo diaminotriazine is first formed and the last halogen atom is to be replaced with an $NH_2$ group, a comparatively large excess of ammonia is very desirable. For example an excess of 300% of the theoretical amount required to replace the halogens with the $NH_2$ radical in the direct amination of the cyanuric halide is satisfactory. This large excess of ammonia for aminating the cyanuric halides may be considerably decreased if an anhydrous liquid solvent which will dissolve ammonia is added to the mixture and serves as a diluent. For example, diethyl ether, dioxane, benzene, nitrobenzene, chloroform and carbon tetrachloride may be used as such solvents. When one of these solvents is used as a diluent the reaction may be controlled to make the monohalodiamino triazine by reacting the anhydrous ammonia with the cyanuric bromide at low temperatures and for a comparatively long period of time. Also when using a diluent the cyanuric bromide may be aminated directly to melamine under the conditions as outlined hereinafter in Example 5.

The following examples are typical of the invention:

Example 1

80 grams of cyanuric halide (bromide and chloride) was added to 400 ml. of anhydrous ammonia at atmospheric pressure. Caution is taken to prevent spattering because the reaction takes place vigorously. After the reaction has been completed the ammonium halide compounds remain in solution in the free ammonia and are separated by filtration from the solid compounds formed. By this reaction 47 grams of dry solid 2-monohalo-4,6-diamino-1,3,5-triazine was recovered which shows practically a quantitative yield.

Example 2

50 grams of cyanuric bromide was placed in a glass-lined bomb and mixed with 150 milliliters of anhydrous liquid ammonia. To facilitate handling these materials the cyanuric bromide and liquid ammonia preferably are cooled to a low temperature so that evaporation will not occur until these ingredients have been placed in a high pressure autoclave. The autoclave is then closed and the temperature raised to 150° C. and held at this temperature for two to three hours. During this heating operation the pressure will automatically rise to about 1400 lbs. and the ammonia will react in the vapor phase. In this example approximately seven times the stoichiometric weight of ammonia has been added to the cyanuric bromide compared to the amount of ammonia required to replace the bromine atoms of the cyanuric bromide. In the reaction the melamine is formed as a solid while the ammonium bromide remains in solution in the ammonia and is separated from the melamine by filtration and washing the precipitate with liquid $NH_3$. A substantially quantitative yield of melamine is obtained.

Example 3

50 grams of cyanuric bromide is mixed with 150 milliliters of liquid $NH_3$ which has been cooled before handling and the mixture is placed in a high pressure autoclave. This mixture is heated to a temperature of 115° C. for a period of two to three hours to promote the reaction for aminating the bromide. In the reaction the pressure rises to approximately 700 lbs. and the ammonia reacts in the liquid phase. The critical temperature of liquid ammonia is 132.4° C. By this reaction a substantially quantitative yield of melamine is obtained, the melamine being formed as a solid and the ammonium bromide remaining in solution in the ammonia. The melamine is recovered by filtration and washing with liquid ammonia.

Example 4

46.5 grams of monobromo diaminotriazine were placed in the bottom of a glass-lined rotary bomb with about 150 ml. of liquid anhydrous ammonia. The mixture was heated to a temperature of 125° C. while the bomb was rotated for two to three hours. During the reaction the pressure was raised to a maximum of 800 lbs. per square inch. A practically theoretical yield of melamine was recovered as a precipitate which was separated from the ammonium bromide formed by washing with liquid ammonia.

Example 5

60 milliliters of liquid ammonia is added to 200 milliliters of well cooled anhydrous ethyl ether. 75 grams of cyanuric bromide is introduced into the cooled mixture and the mixture is then placed in a glass-lined high pressure autoclave. This mixture is heated at a temperature of 150° to 200° C. for a period of two hours to complete the amination of the cyanuric halide. In the reaction the pressure rises to about 900 lbs. per square inch.

The volatile ether and excess ammonia are removed by distillation (evaporation) after which the solid reaction product consisting of substantially theoretical amounts of melamine and ammonium bromide, is slurried into 200 to 300 milliliters of water. By this treatment the ammonium bromide is washed out of the melamine and the melamine may be obtained in substantially quantitative yield by filtration and washing with water.

In accordance with Examples 1, 2, 3 and 4, an excess of ammonia is used in promoting the reaction and therefore it is economical to recover excess ammonia and recycle it to the process. The melamine formed is accordingly washed with liquid ammonia to separate ammonium bromide therefrom. The liquid ammonia is used as a washing agent due to the fact that it is important to have an anhydrous condition of the ammonia that is recycled to the process. After the melamine is formed, however, it is not so essential to use liquid anhydrous ammonia as a washing material because water can be used effectively to dissolve and remove the ammonium bromide without the formation of ammeline and ammelide. It will be noted that in Example 5 water was used for the purpose of washing the ammonium bromide out of the melamine. When a diluent is used in the aminating reaction a sufficiently small excess amount of liquid ammonia may be used in the reaction so that it is not important or desirable to recycle the small excess of ammonia. Accordingly water may be advantageously used in such a case.

In my former application I have discussed the manufacture of cyanuric halides from HCN or NaCN. If cyanogen bromide is converted to cyanuric bromide by the use of an aluminum bromide catalyst a substantially pure cyanuric bromide is formed. On the other hand the aluminum compound preferred in the formation of cyanuric halides is aluminum chloride. Therefore if cyanogen bromide is converted to cyanuric bromide with the use of aluminum chloride a small amount (not to exceed 4%) of cyanuric chloride in the preferred process is formed with the cyanuric bromide. This mixture of cyanuric bromide and chloride may be aminated directly by the processes outlined above for the formation of melamine.

The preferred form of the invention having been thus described, what is claimed as new is:

1. A process of making melamine comprising: reacting anhydrous ammonia in excess with cyanuric mixed halide (chloride and bromide) at a pressure above 500 lbs. per square inch, at a temperature of 100° to 250° C., the excess of ammonia being approximately 300% of the stoichiometric amount of ammonia required to aminate the mixed halide.

2. A process for making melamine comprising reacting anhydrous ammonia in excess with cyanuric halide at a pressure above 500 pounds per square inch, at a temperature of 100° to 250° C., the excess of ammonia being approximately 300 per cent of the stoichiometric amount of ammonia required to aminate the halide.

RAYMOND H. HARTIGAN.

REFERENCES CITED

The following references are of record in the file of this patent:

UNITED STATES PATENTS

| Number | Name | Date |
|---|---|---|
| 2,092,352 | Jensch | Sept. 7, 1937 |
| 2,191,361 | Widmer | Feb. 20, 1940 |

FOREIGN PATENTS

| Number | Country | Date |
|---|---|---|
| 466,957 | Great Britain | June 9, 1937 |
| 523,448 | Great Britain | 1940 |
| 106,398 | Switzerland | 1924 |

OTHER REFERENCES

Meyer: J. für Prat. Chemie, 1910, pp. 531 and 532.

McClellan: Industrial and Engineering Chem. vol. 32, No. 9, Sept. 1940. pp. 1181–1186.

Berichte, Diels, 32, p. 695.